(12) United States Patent
Zou

(10) Patent No.: US 12,346,509 B2
(45) Date of Patent: Jul. 1, 2025

(54) INPUT DEVICE WITH ROTATABLE CONTROL KNOBS

(71) Applicant: Leica Biosystems Imaging, Inc., Vista, CA (US)

(72) Inventor: Yunlu Zou, San Diego, CA (US)

(73) Assignee: Leica Biosystems Imaging, Inc

( * ) Notice: Subject to any disclaimer, the term of this patent is extended or adjusted under 35 U.S.C. 154(b) by 0 days.

(21) Appl. No.: 18/203,808

(22) Filed: May 31, 2023

(65) Prior Publication Data

US 2023/0305649 A1    Sep. 28, 2023

Related U.S. Application Data

(63) Continuation of application No. PCT/US2021/063319, filed on Dec. 14, 2021.

(60) Provisional application No. 63/129,860, filed on Dec. 23, 2020.

(51) Int. Cl.
| G06F 3/0362 | (2013.01) |
| G06F 3/02 | (2006.01) |
| G06F 3/0354 | (2013.01) |
| G06F 3/04845 | (2022.01) |

(52) U.S. Cl.
CPC .......... *G06F 3/0362* (2013.01); *G06F 3/0213* (2013.01); *G06F 3/03547* (2013.01); *G06F 3/04845* (2013.01)

(58) Field of Classification Search
CPC .. G06F 3/0362; G06F 3/0213; G06F 3/03547; G06F 3/04845; G06F 2203/04806; G06F 3/0485; G06F 3/0202
See application file for complete search history.

(56) References Cited

U.S. PATENT DOCUMENTS

| 7,031,056 B2* | 4/2006 | Peter | G02B 21/242 |
| | | | 359/392 |
| 7,441,193 B1* | 10/2008 | Wild | G06F 3/0219 |
| | | | 345/173 |
| 7,518,745 B2* | 4/2009 | Guerraz | G06F 3/016 |
| | | | 358/448 |
| 10,018,823 B2* | 7/2018 | Jockusch | G02B 21/365 |

(Continued)

FOREIGN PATENT DOCUMENTS

| CN | 111831128 A | 10/2020 |
| EP | 2613239 A1 | 7/2013 |

OTHER PUBLICATIONS

Cade D1, "This Designer Turned the Photoshop Toolbar into a Custom Keyboard", Apr. 15, 2020, Retrieved from the Internet: <https://petapixel.com/2020/04/15/this-designer-turned-the-photoshop-toolbar-into-a-custom-keyboard/> Accessed on Jun. 4, 2024, 11 pages.

(Continued)

*Primary Examiner* — Grant Sitta
(74) *Attorney, Agent, or Firm* — Frost Brown Todd LLP

(57) ABSTRACT

An input device allows a user to manipulate an image displayed by a user interface (UI) of a computer. The input device includes a housing, a first rotatable control knob supported by the housing, and a second rotatable control knob supported by the housing. The first and second rotatable control knobs allow the user to perform at least zooming and panning manipulations of the image on the UI. The input device can further include a third rotatable control knob and a touch pad. The input device can be configured as a keyboard.

17 Claims, 7 Drawing Sheets

(56) References Cited

U.S. PATENT DOCUMENTS

| | | | | | |
|---|---|---|---|---|---|
| 10,473,909 | B2* | 11/2019 | Yabugaki | | G06F 3/0412 |
| 11,636,627 | B2* | 4/2023 | Siegel | | G02B 21/361 |
| | | | | | 348/79 |
| 2003/0043114 | A1* | 3/2003 | Silfverberg | | G06F 1/169 |
| | | | | | 345/157 |
| 2004/0109169 | A1* | 6/2004 | Olschewski | | G02B 21/365 |
| | | | | | 356/609 |
| 2005/0219685 | A1* | 10/2005 | Swift | | G02B 21/0008 |
| | | | | | 359/368 |
| 2007/0066967 | A1* | 3/2007 | Sieckmann | | G02B 21/365 |
| | | | | | 606/13 |
| 2009/0091566 | A1* | 4/2009 | Turney | | G06T 7/33 |
| | | | | | 382/128 |
| 2009/0168161 | A1* | 7/2009 | Guiney | | G02B 21/367 |
| | | | | | 359/368 |
| 2011/0013010 | A1* | 1/2011 | Shirota | | G02B 21/365 |
| | | | | | 345/173 |
| 2011/0038041 | A1* | 2/2011 | Schadwinkel | | G02B 21/242 |
| | | | | | 359/383 |
| 2012/0092247 | A1* | 4/2012 | Orrock | | G16H 30/20 |
| | | | | | 345/156 |
| 2012/0224044 | A1* | 9/2012 | Lett | | G01N 21/6458 |
| | | | | | 348/79 |
| 2014/0139526 | A1* | 5/2014 | Kim | | G06T 7/0012 |
| | | | | | 345/424 |
| 2014/0313311 | A1* | 10/2014 | Jockusch | | G02B 21/365 |
| | | | | | 348/79 |
| 2016/0202150 | A1* | 7/2016 | Schlaudraff | | G01N 1/286 |
| | | | | | 435/309.1 |
| 2017/0242235 | A1* | 8/2017 | Lallement | | G06T 11/60 |
| 2018/0031817 | A1* | 2/2018 | Barral | | G16H 30/20 |
| 2018/0166235 | A1* | 6/2018 | Merminod | | G06F 3/02 |
| 2018/0348497 | A1* | 12/2018 | Sakamoto | | G02B 21/362 |
| 2019/0107895 | A1* | 4/2019 | Steinman | | G06F 3/165 |
| 2020/0097727 | A1* | 3/2020 | Stumpe | | G02B 21/361 |
| 2021/0327564 | A1* | 10/2021 | Ferreira | | G16H 30/40 |

OTHER PUBLICATIONS

The Digital Pathology Company: "SlideDriver." <https://www.3dhistech.com/diagnostics/lab-components/slidedriver/> Published Jan. 16, 2021. Accessed on Nov. 25, 2024, Internet Archive, <https://web.archive.org/web/20210116111650/https://www.3dhistech.com/diagnostics/lab-components/slidedriver/>, 1 page.

Mechanical Keyboards, "Zeitgeist with salmon weight", Nov. 4, 2020, Retrieved from the Internet: <https://www.reddit.com/r/MechanicalKeyboards/comments/jnj417/zeitgeist_with_salmon_weight/> Accessed on Jun. 4, 2024, 6 pages.

Molin, Jesper, Claes Lundström, and Morten Fjeld. "A comparative study of input devices for digital slide navigation." *Journal of Pathology Informatics* 6.1 (2015): 7 pages.

European Communication dated May 31, 2024, for Application No. 21841102.3, 4 pages.

International Search Report and Written Opinion dated May 11, 2022, for International Application No. PCT/US2021/063319, 16 pages.

\* cited by examiner

INPUT DEVICE WITH ROTATABLE CONTROL KNOBS

CROSS-REFERENCE TO RELATED APPLICATION(S)

This application is a continuation of International Application Number PCT/US2021/063319, entitled "Input Device with Rotatable Control Knobs," filed on Dec. 14, 2021, which claims the benefit of U.S. Provisional Patent Application No. 63/129,860, filed Dec. 23, 2020, the disclosures of which are incorporated herein by reference.

BACKGROUND

Field

The disclosed technology relates to an ergonomic input device for a user to repetitively manipulate an image displayed on a user interface (UI) of a computer, and more particularly, relates to apparatuses having a plurality of knobs positioned for the user to pan in multiple directions and zoom the image displayed on the UI while minimizing the risk of developing musculoskeletal disorders (MSD).

SUMMARY

In this disclosure, ergonomic devices for navigating digital images are included. In certain embodiments, the devices will keep a user or pathologist's forearm muscle in a neutral position and apply almost no strain on wrists. In certain embodiments, the user or pathologist can use rotating knobs with fingers similar as using a microscope to navigate the digital images. In certain embodiments, operation tasks are distributed on both hands for reduced workload. In certain embodiments, parallel tasking for zooming and panning with individual hands offers navigation speed which outperforms a microscope. In certain embodiments, when integrated into a regular keyboard, standard keyboard keys and mouse are still in normal convenient locations for access requiring a minimum learning curve for the user or pathologist.

In a first aspect, an input device is configured to allow a user to manipulate an image displayed by a user interface (UI) of a computer. The input device includes a housing having a first end and a second end, a first rotatable control knob supported by the housing, the first rotatable control knob being configured for the user to perform a first manipulation of the image on the UI, and a second rotatable control knob supported by the housing, the second rotatable control knob being configured for the user to perform a second manipulation of the image on the UI. The second manipulation is different from the first manipulation.

In another aspect, a computer keyboard for use with a display screen includes a housing and a panel of keys supported by the housing. The panel of keys are configured to receive user input for a computer associated with the display screen. The computer keyboard further includes a first rotatable control knob supported by the housing, the first rotatable control knob being configured for the user to perform a first manipulation of an image displayed on the display screen. The computer keyboard further includes a second rotatable control knob supported by the housing, the second rotatable control knob being configured for the user to perform a second manipulation of the image. The second manipulation is different from the first manipulation. The computer keyboard further includes a third rotatable control knob supported by the housing, the third rotatable control knob being configured for the user to perform a third manipulation of the image. The third manipulation is different from the first manipulation and the second manipulation. The computer keyboard further includes a touch pad supported by the housing, the touch pad being configured for the user to add annotations to and/or select the image.

In another aspect, a device is configured to allow a user to manipulate an image displayed by a user interface (UI). The device includes a housing, a first rotatable control knob supported by the housing, the first rotatable control knob being configured for the user to perform a first manipulation of the image on the UI, and a second rotatable control knob supported by the housing, the second rotatable control knob being configured for the user to perform a second manipulation of the image on the UI, wherein the second manipulation is different from the first manipulation.

In another aspect, a method for manipulating a scanned digital image of a tissue sample for biopsy displayed on a user interface (UI) is disclosed. The method includes rotating a first control knob to perform a first manipulation of the scanned digital image on the UI and rotating a second control knob to perform a second manipulation of the scanned digital image on the UI, wherein the second manipulation is different from the first manipulation.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

Figure 1A:
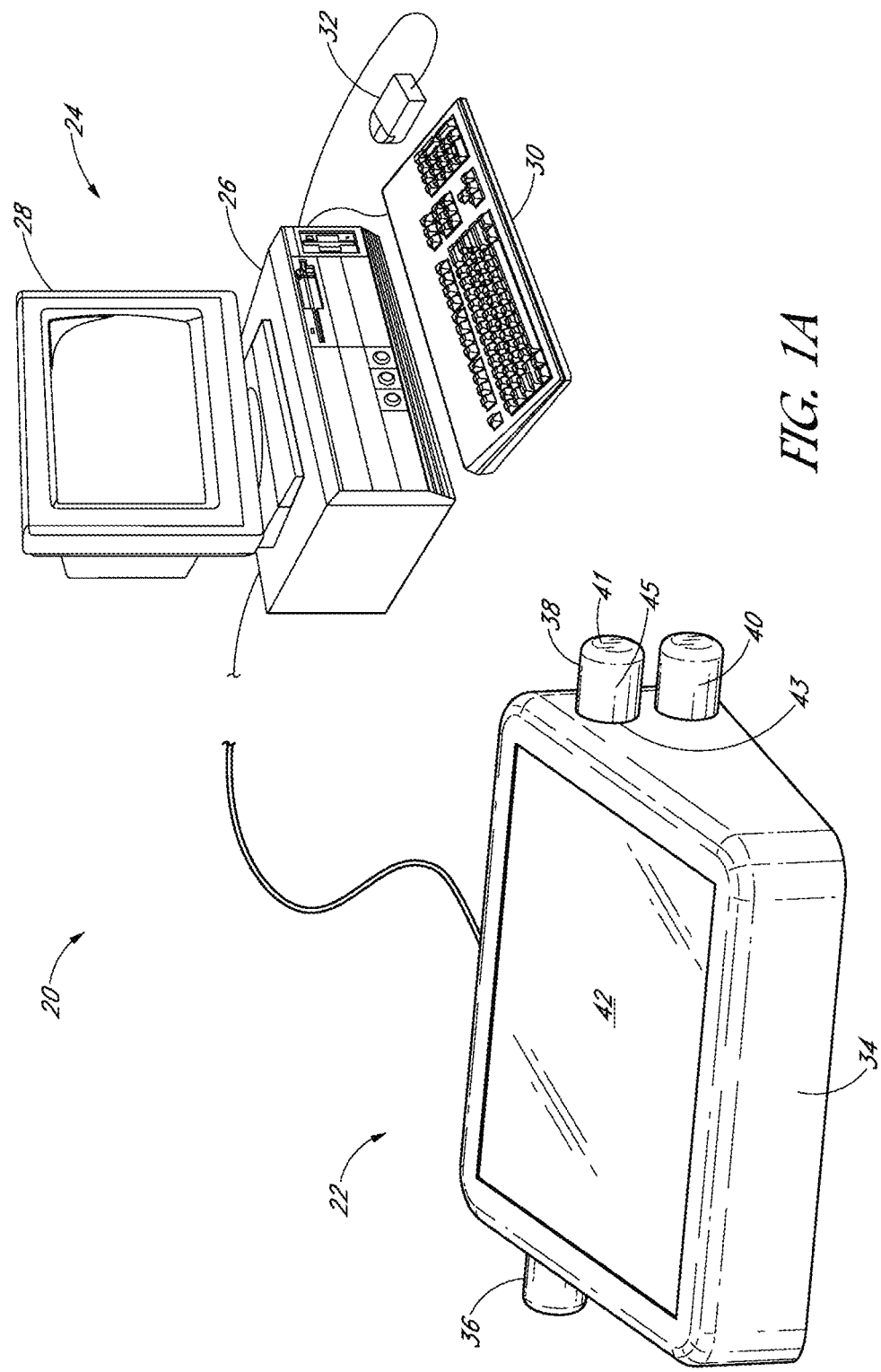
FIG. 1A is a front perspective view of an input device according to a preferred embodiment of the present invention shown with a computer system.

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

The following description is provided in the context of an ergonomic computer-implemented system and method for a pathologist to repetitively manipulate selected portions of a digital image displayed on a display screen. The digital images can be from laboratory samples of body tissue. The pathologist studies the digital image to determine the causes and effects of diseases for diagnostic or forensic purposes. It will be appreciated, however, that the disclosed systems and methods have greater utility and may be used for different images outside of the medical field.

It is desirable for a computer system to accept user input from input devices. Input devices can include a keyboard to enter text into the UI in combination with a mouse for scrolling the UI. A mouse can include many buttons or inputs to accomplish multiple manipulations of an image. However, even where the mouse allows multiple manipulations, those manipulations are still being input by a single hand of the user requiring a complex set of finger manipulations of the single hand. Further, while a mouse is designed to allow multiple manipulations of the image, the sensitivity provided by the mouse is inadequate to provide precise manipulation due to user fatigue. Certain industries require repetitive manipulation of an image. The use of a mouse for this purpose is not only inconvenient but can lead to musculoskeletal disorders (MSD).

One of the large barriers to roll digital pathology in clinic application is the inconvenience (nonergonomic) to view digital images using a keyboard and a mouse. Pathologists need to frequently pan and zoom on hundreds of images daily. In this way, the user must click the mouse or hold down the button on the mouse to pan the image. It's a similar experience with a keyboard which requires the user to hold down keys to pan. Usually roll digital pathology requires the pathologist to perform tens to hundreds of moves for a single image. For hundreds of images a day, the pathologists will perform thousands to tens of thousands of clicks or holds. It is very easy to develop hand and finger fatigue and cause potential wrist tendonitis or MSD. Repetitive clicking and holding down the button on the mouse or keyboard to pan or zoom the image may cause potential wrist tendonitis or MSD.

A comparative study of input devices including a mouse, a 6DOF navigator, and a touch pad identified desirable characteristics of a preferred input device. The three different input device implementations were compared in terms of time to diagnose, perceived workload and users' preferences. These characteristics included ease of navigation so that the pathologist's effort can be put into the review of the case, and therefore, a low perceived workload. See "A comparative study of input devices for digital slide navigation" from the 2nd Nordic Symposium on Digital Pathology. However, the study found that a quick and seamless integration between input devices and the navigation of digital slides still remains a key barrier for many pathologists to "go digital."

Figure 2:
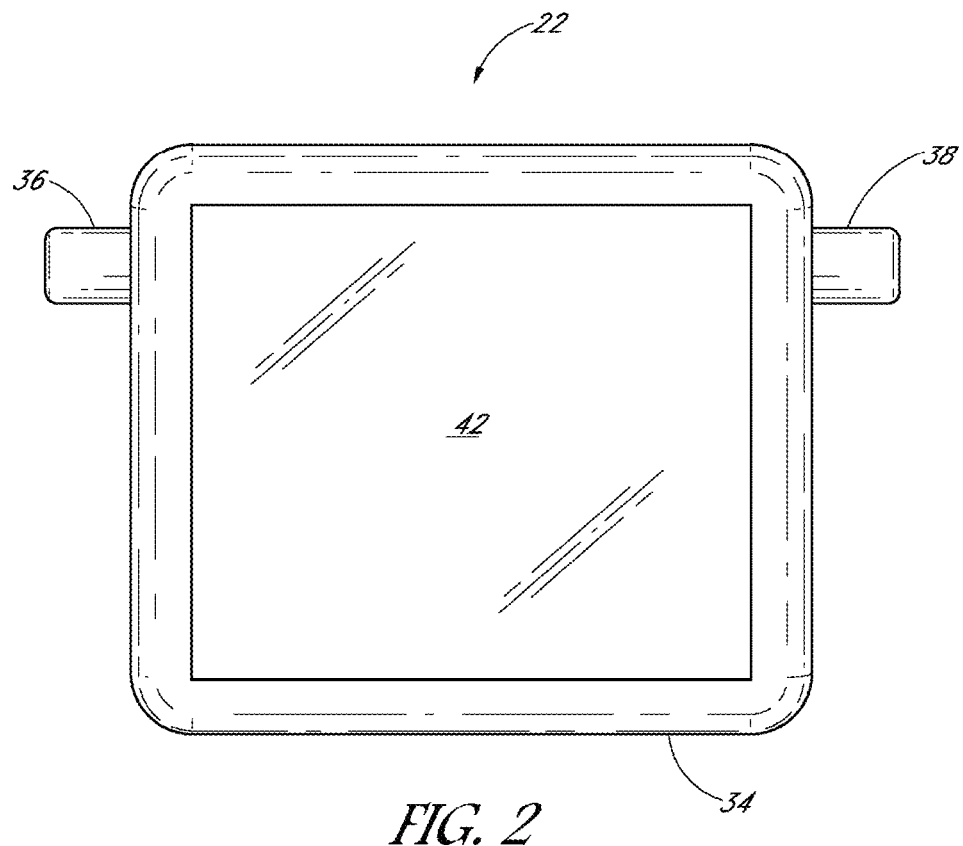
FIG. 2 is a top plan view of the input device from FIG. 1A.

FIG. 1A illustrates a diagnostic system 20 that includes an input device 22 and an optional computer system 24. FIG. 2 is a top plan view of the input device 22 from FIG. 1A. The exemplary diagnostic system 20 embodies several features of a preferred embodiment of the present invention. The diagnostic system 20 incorporates software, methods, and systems for manipulating an image displayed by a user interface (UI) of a computer 26. In certain embodiments, the diagnostic system 20 receives input from a user via one or more rotatable control knobs 36, 38, 40 to manipulate a digital image.

In certain embodiments, the diagnostic system 20 includes an input device 22 with several rotatable control knobs 36, 38, 40 to mimic certain mouse and/or keyboard functions for zooming and panning a digital slide image. For example, in certain embodiments, one of the one or more rotatable control knobs 36, 38, 40 is similar to changing magnifications of a microscope but in a more continuous fashion digitally from low to high or high to low magnification (zooming) than otherwise switching objectives with various magnifications in a microscope. Another of the one or more rotatable control knobs 36, 38, 40 is similar to an up/down stage control of the microscope. Another of the one or more rotatable control knobs 36, 38, 40 is similar to a left/right stage control of the microscope.

In certain embodiments, the input device 22 is configured as part of the diagnostic system 20. For example, the one or more rotatable control knobs 36, 38, 40 can be coupled to any components of the diagnostic system 20. In certain embodiments, the input device 22 is configured as part of the computer system 24. In certain embodiments, the input device 22 is configured as a monitor 28. For example, the one or more rotatable control knobs 36, 38, 40 can be coupled to the monitor 28. In certain embodiments, the input device 22 is configured as the computer 26. For example, the one or more rotatable control knobs 36, 38, 40 can be coupled to the computer 26.

In certain embodiments, the input device 22 includes more or less than the number of rotatable control knobs illustrated in FIG. 1A. For example, in certain embodiments, the input device 22 comprises four rotatable control knobs. The fourth rotatable control knob can provide focus stacking or z-stack. Focus stacking is a digital image processing technique which combines multiple images taken at different focus distances to give a resulting image with a greater depth of field (DOF) than any of the individual source images.

In certain embodiments, each of the one or more rotatable control knobs 36, 38, 40 comprises top 41 and bottom 43 surfaces, and an outer perimeter 45. In certain embodiments, each of the one or more rotatable control knobs 36, 38, 40 is secured to the input device 22 via a cylindrical shaft (not shown). In certain embodiments, each of the one or more rotatable control knobs 36, 38, 40 is secured to its respective shaft by a fastener which is inserted through a hole in the top surface 41. The one or more rotatable control knobs 36, 38, 40 can be constructed out of any rigid, durable material, such as plastic, metal or hard rubber. In certain embodiments, the outer perimeter 45 has a tapering shape.

In certain embodiments, each of the one or more rotatable control knobs 36, 38, 40 comprises a rotary encoder. In certain embodiments, the rotary encoder is configured to convert the angular position or motion of the one or more rotatable control knobs 36, 38, 40 to analog or digital output signals. In certain embodiments, each of the rotary encoders is connected to the microcontroller 49 via associated electronic circuitry.

In certain embodiments, at least a portion of the outer perimeter 45 is optionally a friction surface. The friction surface can be made out of any material which permits a user to easily rotate the one or more rotatable control knobs 36, 38, 40 with his or her fingers. Alternatively, the outer perimeter 45 may include no materials in addition to that of the outer perimeter 45, but may simply comprise an abrasive surface, or friction-generating pattern machined or molded onto the outer perimeter 45 of the one or more rotatable control knobs 36, 38, 40. In certain embodiments, one or more rotatable control knobs 36, 38, 40 are knurled and suitable for light adjustment work and fine-tuning.

In certain embodiments, the top surface 41 of the one or more rotatable control knobs 36, 38, 40 can further include a line (not shown) extending from the outer perimeter 45 of the one or more rotatable control knobs 36, 38, 40, towards the center of the one or more rotatable control knobs 36, 38, 40. The line may serve as a visual indicator to indicate to the user or pathologist the degree of rotation of the one or more rotatable control knobs 36, 38, 40.

In certain embodiments, the locations of the one or more rotatable control knobs 36, 38, 40 relative to the input device 22 are adjustable. For example, in certain embodiments, the one or more rotatable control knobs 36, 38, 40 can be raised or lowered relative to the input device 22 to change a height of the one or more rotatable control knobs 36, 38, 40 relative to a table or other support surface of the input device 22. In this way, the user or pathologist can adjust the height of the one or more rotatable control knobs 36, 38, 40 to improve ergonomics. In certain embodiments, an adjustable connector (not shown) connects the one or more rotatable control knobs 36, 38, 40 to the housing 34.

In certain embodiments, the input device 22 includes one or more supporting legs to adjust an angle between the user or pathologist and the input device 22 to improve ergonomics. For example, in certain embodiments, the angle is adjusted by the user stretching out or pulling back the one or more supporting legs. In certain embodiments, the one or more supporting legs are positioned close to a back side of the input device 22. In certain embodiments, the one or more supporting legs can be positioned close to a back side 62 on the bottom surface.

In certain embodiments, the input device 22 includes one or more recesses to receive the one or more supporting legs when the supporting legs are pulled back against the bottom surface. In certain embodiments, when the one or more supporting legs are received in the recesses at the bottom surface, the bottom surface of the input device 22 is in complete contact with the table or other support surface, and no angle is formed between the input device 22 and the table. When the one or more supporting legs are turned for a certain angle to extend out of the bottom surface an angle between the table and the input device 22 is then formed, and the top surface of the input device 22 is slightly inclined toward the user or pathologist.

In certain embodiments, the one or more rotatable control knobs 36, 38, 40 are removable from the housing 34. For example, in certain embodiments, the housing 34 comprises a connector (not shown) configured to removably receive a portion of at least one of the one or more rotatable control knobs 36, 38, 40. In certain embodiments, the connector is a USB connector. In certain embodiments, the USB connector is disposed on the first or second ends of the input device 22. A portion of the one or more rotatable control knobs 36, 38, 40 that is compatible with the USB connector is engaged with the USB connector on the input device 22. When engaged, the functionality of the one or more rotatable control knobs 36, 38, 40 is the same as described with respect to FIG. 1A. In this way, the one or more rotatable control knobs 36, 38, 40 can be added to an input device, such as the keyboard 30, if the input device or keyboard 30 includes the USB connector. Of course, the connector is not limited to a USB connector, and instead can be any connector known to a person having ordinary skill in the art.

In certain embodiments, the one or more rotatable control knobs 36, 38, 40 comprise a microcontroller 49. In certain embodiments, the one or more rotatable control knobs 36, 38, 40 comprise a rotary encoder. Having the microcontroller 49 and/or the rotary encoder disposed in the one or more rotatable knobs 36, 38, 40 may be advantageous when the one or more rotatable knobs 36, 38, 40 are removable from the housing 34. In certain embodiments, the microcontroller 49 is configured to receive a position and/or zoom signal from the rotary encoder associated with the rotatable control knob 36, 38, 40 and convert the position and/or zoom signal to an instruction for the computer 24 to manipulate the image displayed by the UI. For example, the microcontroller 49 can send the converted position and/or zoom signal via USB to the computer 24. In other embodiments as disclosed below, the microcontroller 49 and/or the rotary encoder are disposed in the housing 34 and/or shared by more than one of the rotatable control knobs 36, 38, 40. In certain embodiments, the microcontroller 49 is shared with other inputs to the input device 22 such as, for example, the touch pad 42 and/or the keys of a keyboard (see FIGS. 6-10).

Figure 3:
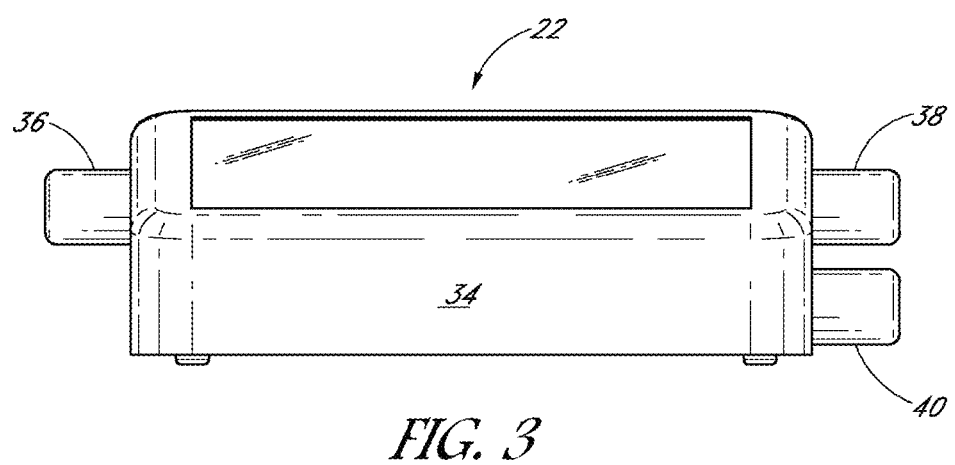
FIG. 3 is a front view of the input device of FIG. 2.

FIG. 3 is a front view of the input device 22 of FIG. 2. The input device 22 can be used as a standalone device or in combination with the computer system 24. When used as a standalone device, the input device 22 can include components of the computer system 24. For example, in certain embodiments where the input device is configured as a standalone device, the input device 22 includes at least a processor, memory, and a display. In certain embodiments, the input device 22 connects to the computer system 24 via a wired or wireless connection. In certain embodiments, the input device 22 can be directly connected to a wired or wireless network without being connected to the computer system 24. In certain embodiments, the network includes one or more servers.

In the embodiment illustrated in FIG. 1A, the computer system 24 includes additional input devices, such as a keyboard 30 and a pointing device such as a mouse 32. Other input devices (not shown) that may be part of the computer system 24 include a touch pad, trackpad, joystick, game pad, or the like. In certain embodiments and as illustrated in FIGS. 6-10, the input device 22 is configured as a keyboard 50. Of course, the input device 22 is not limited to the illustrated configurations and can be configured as any type of peripheral device (e.g., touch pad, trackpad, joystick, game pad, or the like) that includes one or more rotatable control knobs 36, 38, 40 to manipulate a digital image. In the illustrated embodiment, the input device 22 further includes a touch pad 42 in combination with the one or more rotatable control knobs 36, 38, 40. In certain embodiments, the touch pad 42 is employed by the user or pathologist for annotation or drawing and slide selection. The touch pad 42 can be any appropriate shape, such as a square, rectangular, diamond, circular, cross, or oval. Of course, the input device 22 need not include the touch pad 42. For example, in certain embodiments, the mouse 32 is employed instead of the touch pad 42 for annotation or drawing and slide selection.

Figure 4:
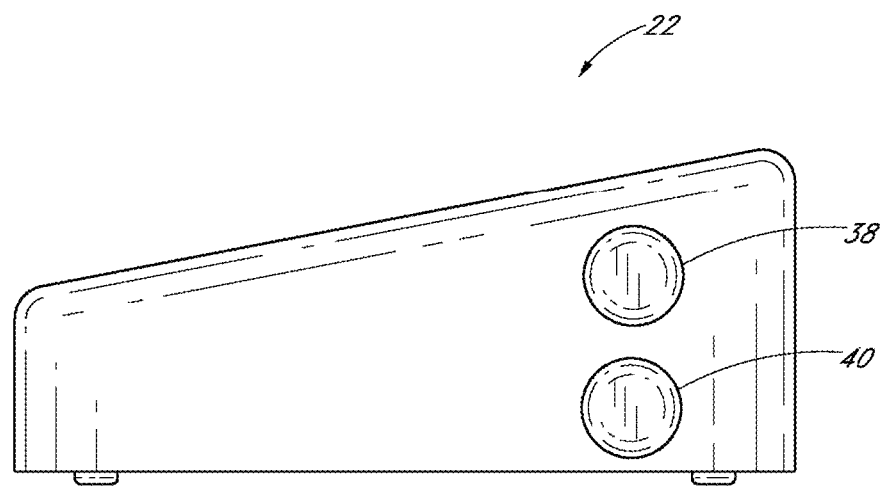
FIG. 4 is a right side view of the input device of FIG. 2.

FIG. 4 is a right side view of the input device 22 of FIG. 2.

Figure 5:
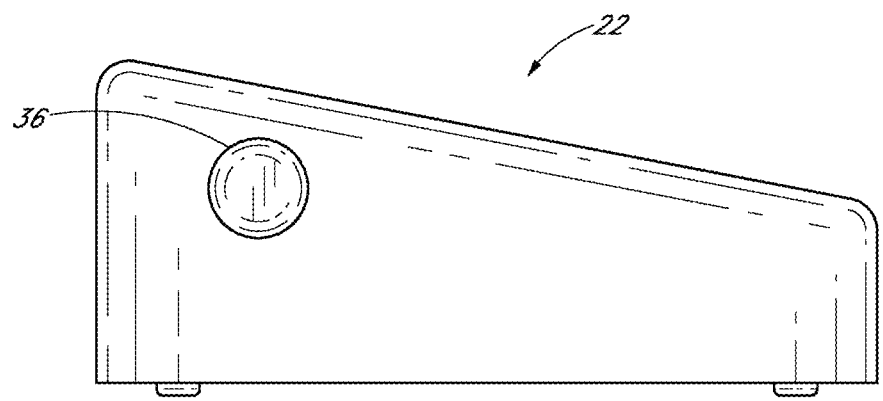
FIG. 5 is a left side view of the input device of FIG. 2.

FIG. 5 is a left side view of the input device 22 of FIG. 2. The input device 22 is operatively connected to the computer 26 and is configured for panning up/down, panning left/right, and zooming an image in multiple axes relative to the display screen of the monitor 28. In this way, the input device 22 is configured for two-handed functionality with the one or more rotatable control knobs 36, 38, 40.

A method for a user or pathologist to manipulate an image displayed on a user interface (UI) is disclosed. In certain embodiments, the image is a scanned digital image. In certain embodiments, the scanned digital image is of a tissue sample for biopsy. The process begins by displaying the image on the UI. The process moves to rotating a first control knob to perform a first manipulation of the scanned digital image on the UI. Next, the process moves to rotating a second control knob to perform a second manipulation of the scanned digital image on the UI. In certain embodiments, the second manipulation is different from the first manipulation. In certain embodiments, the process moves to rotating a third control knob to perform a third manipulation of the scanned digital image on the UI. In certain embodiments, the third manipulation is different from the first manipulation and the second manipulation. In certain embodiments, the process moves to adding annotations to and/or selecting the manipulated image. In certain embodiments, the annotated and/or selected image is then analyzed.

In certain embodiments, the input device 22 comprises a housing 34. In certain embodiments, the housing 34 has a left end and a right end. In certain embodiments, at least one of the rotatable control knobs 36, 38, 40 is disposed on each of the left and right ends of the housing 34. In the illustrated embodiments, the housing 34 includes two rotatable control knobs 36, 38, 40 on the right end of the housing 34. Of course, the invention is not limited to the illustrated embodiments. For example, in certain other embodiments, the housing 34 includes two rotatable control knobs 36, 38, 40 on the left end of the housing 34. One of the rotatable control knobs 36, 38, 40 is configured for the user to perform a first manipulation of the image on the display or UI. Another one of the rotatable control knobs 36, 38, 40 is configured for the user to perform a second manipulation of the image on the display or UI. A third one of the rotatable control knobs 36, 38, 40 is configured for the user to perform a third manipulation of the image on the display or UI.

With at least one of the rotatable control knobs disposed on each of the left and right ends of the housing 34, both rotatable control knobs can be used simultaneously on either side of the input device 22 for zooming (in/out) and/or panning (up/down or left/right) control. In this way, zooming and/or panning control is separately controlled by individual hands of the user. In certain embodiments, the third one of the rotatable control knobs 36, 38, 40 is also configured for panning control in a different direction (up/down or left/right).

In certain embodiments, the one of the rotatable control knobs 36, 38, 40 configured for zooming includes a coarse zoom knob coaxially aligned with a fine zoom knob. In certain embodiments, the coarse zoom knob is larger than the fine zoom knob. In certain embodiments, the coarse and fine zoom adjustments are implemented electronically. For example, in certain embodiments, electronic circuitry converts fast rotation to coarse pulses for the rotary encoder. In this way, the one of the rotatable control knobs 36, 38, 40 can be used for coarse zoom and slow rotation as well as for fine pulses for fine zoom. In certain embodiments, the coarse and fine zoom knobs are realized by mechanical gear shifting.

The term "panning" describes the movement of an image relative to a display screen in a left or right direction or in an up or down direction. For example, the term "pan left" as used herein relates to moving the contents of the display screen left an amount. Similarly, the term "pan right" as used herein relates to moving the contents of the display screen right an amount. The term "pan up" as used herein relates to moving the contents of the display screen up an amount. Similarly, the term "pan down" as used herein relates to moving the contents of the display screen down an amount.

The term "zooming" describes a decrease or increase in magnification of an image relative to a display screen. For example, the term "zooming in" as used herein relates to increasing the magnification of the contents of the display screen. Similarly, the term "zooming out" as used herein relates to decreasing the magnification of the contents of the display screen.

In certain embodiments, the computer system 24 includes a computer 26 and a monitor 28. In certain embodiments, the computer system 24 operates as an independent workstation. In certain other embodiments, the computer system 24 operates in a networked environment. The networked environment can be formed by logical connections between one or more remote computers (not shown). The remote computer may be a server, a router, a network PC, a peer device, or other common network node, and may include many or all of the elements described above relative to the computer 26. Exemplary logical connections include a local area network (LAN) and a wide area network (WAN). When used in a LAN networking environment, the computer 26 can be connected to a local network through a network interface or adapter. When used in a WAN networking environment, the computer 26 can include a modem or other means for establishing a communications link over the wide area network, e.g., to the Internet. Such networking environments, such as LAN and WAN, are common in offices, enterprise-wide computer networks, intranets, and the Internet.

In certain embodiments, the computer 26 is in communication with a server via a network. Of course, the computer 26 can include a desktop, laptop, personal digital assistant (PDA), phone, or any other computing device accessible by the user. In certain embodiments, the computer 26 connects to the network via a wireless connection through a cellular or satellite network using a cellular or satellite modem but can also connect through any other network carrying another protocol. For example, in certain embodiments, the computer 26 connects to the network via a wired connection. Similarly, the network can connect to the server via a wired or wireless connection.

Figure 1B:
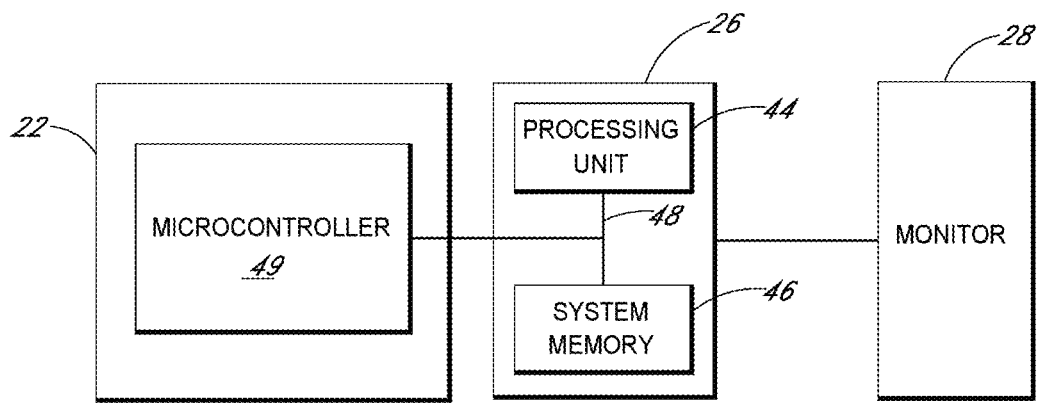
FIG. 1B is a schematic view of the input device, the computer, and the monitor from FIG. 1A.

FIG. 1B is a schematic view of the input device 22, the computer 26, and the monitor 28 from FIG. 1A. The computer 26 provides a general-purpose digital computing environment that may be used in combination with the input device 22 to implement various aspects of the present invention. In certain embodiments, the computer 26 includes a processing unit 44, a system memory 46, and a system bus 48. In certain embodiments, the system bus 48 couples various system components including the system memory 46 to the processing unit 44. The system bus 48 may be any of several types of bus structures including a memory bus or memory controller, a peripheral bus, and a local bus using any of a variety of bus architectures. In certain embodiments, the system memory 46 includes read only memory (ROM) and/or random access memory (RAM).

A basic input/output system (BIOS), containing the basic routines that help to transfer information between elements within the computer 26, such as during start-up, can be stored in the ROM of the system memory 46. In certain embodiments, the computer 26 also includes one or more of a hard disk drive, a magnetic disk drive, or an optical disk drive. The drives and their associated computer-readable media provide nonvolatile storage of computer readable instructions, data structures, program modules, and other data for the computer 26. It will be appreciated by those skilled in the art that other types of computer readable media that may store data that is accessible by the computer 26, such as magnetic cassettes, flash memory cards, digital video disks, random access memories (RAMs), read only memories (ROMs), and the like, may also be used in the exemplary operating environment.

In certain embodiments, software modules may be stored on one or more of the hard disk drive, the magnetic disk, the optical disk, the ROM, or the RAM. In certain embodiments, the software modules can include an operating system, one or more application programs, other program modules, and program data. In certain embodiments, the software modules can include an application program configured to receive user instructions input to the input device 22 for manipulating an image displayed on the monitor 28. In certain embodiments, the software modules receive the user instructions from the microcontroller 49. In certain embodiments, the image can be a digital image being viewed by a pathologist. In certain embodiments, the input device 22 is configured to receive input generated by the user via the one or more rotatable control knobs 36, 38, 40. In the illustrated embodiment, the plurality of rotatable control knobs includes three control knobs 36, 38, 40.

In certain embodiments, the housing 34 can include the microcontroller (MCU) 49. As previously described, in certain other embodiments, the microcontroller 49 can be disposed in the one or more rotatable control knobs 36, 38, 40.

In certain embodiments, the microcontroller 49 contains one or more CPUs along with memory and programmable general-purpose input/output (GPIO). In certain embodiments, GPIO pins are connected to the one or more rotatable control knobs 36, 38, 40 to define an input/output map. In certain embodiments of the input device 22 that include the touch pad 42, the GPIO pins can be further connected to the touch pad 42. In certain embodiments, firmware including operating instructions can be flashed to the microcontroller 49 as known to a person having ordinary skill in the art. In certain embodiments, the firmware of the microcontroller 49 converts the input received from the user or pathologist via the one or more rotatable control knobs 36, 38, 40 and/or touch pad 42 to commands suitable for transmission to the computer 26.

In certain embodiments, the input device 22 and/or the other peripheral devices (e.g., keyboard 30 and mouse 32) connect to the computer 26 through an interface. In certain embodiments, the data or commands from the microcontroller 49 are transmitted to the computer 26 using the Universal Serial Bus (USB) standard. Of course, the input device 22 can use other protocols known to a person having ordinary skill in the art for transmitting data or commands between peripherals and the computer 26. Other exemplary interfaces include serial ports, parallel ports, and game ports. Further still, the input device 22 and/or the other peripheral devices may be coupled directly to the system bus via an appropriate interface (not shown).

The monitor 28 or other type of display device with a display screen is also connected to the system bus 48 via an interface, such as a video adapter. The monitor 28 can display information for the user or pathologist, such as one or more digital images.

Figure 6:
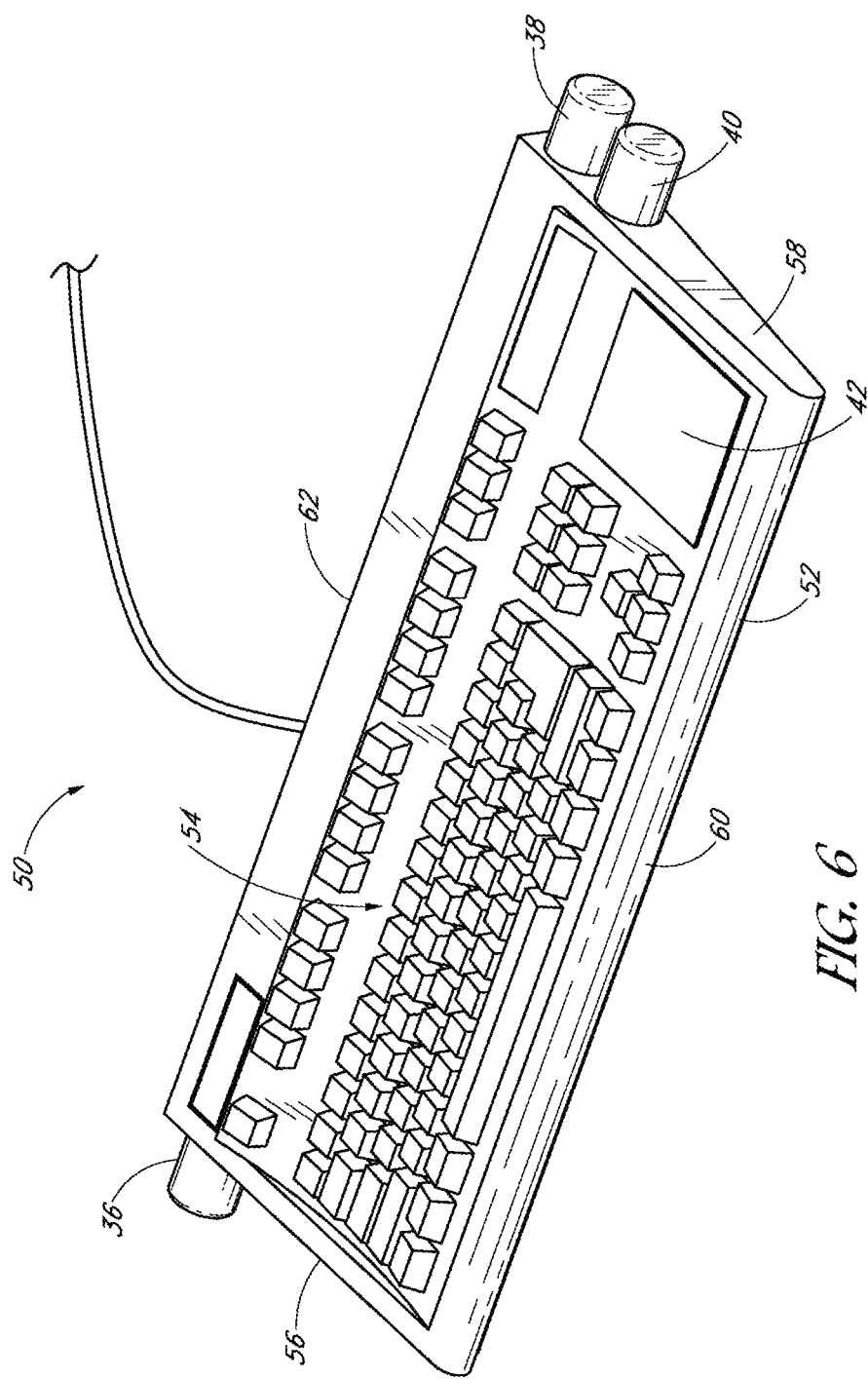
FIG. 6 is a front perspective view of a keyboard according to another preferred embodiment of the present invention.

FIG. 6 is a front perspective view of a computer keyboard 50 according to another preferred embodiment of the present invention. The keyboard 50 is configured to allow the user or pathologist to manipulate the image displayed by a user interface (UI) of the computer 26 (see FIG. 1A). In certain embodiments, the keyboard 50 is similar to the input device 22 except the keyboard 50 includes a panel of keys 54.

Figure 7:
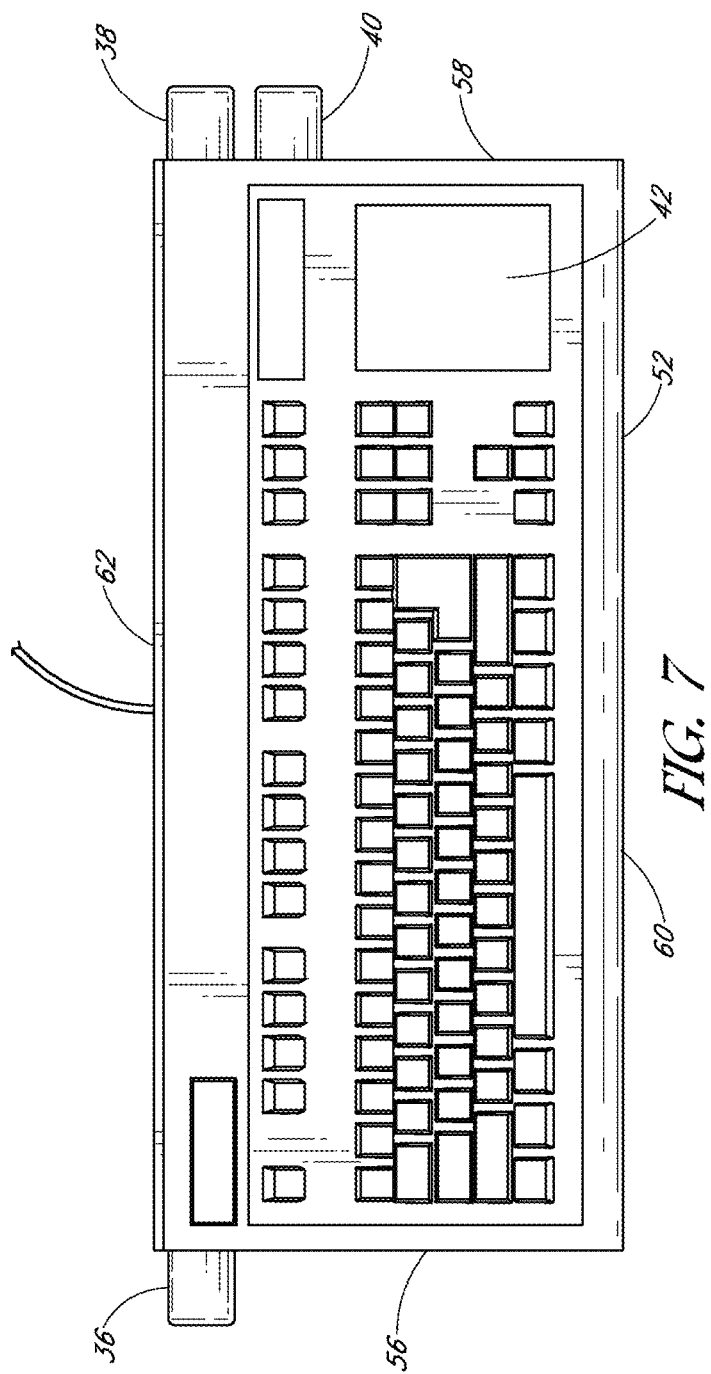
FIG. 7 is a top plan view of the keyboard from FIG. 6.

FIG. 7 is a top plan view of the keyboard 50 from FIG. 6.

Figure 8:
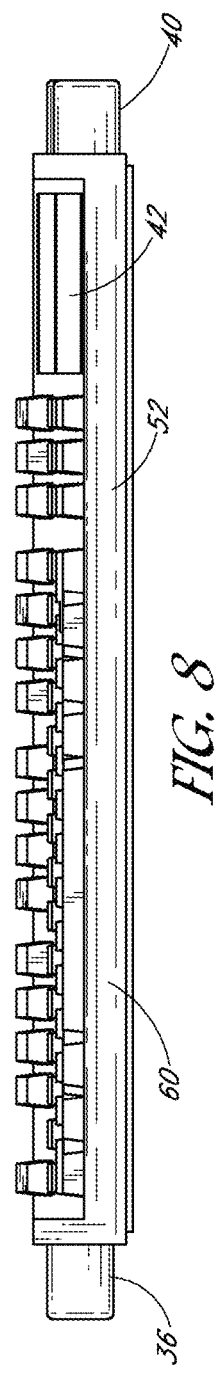
FIG. 8 is a front view of the keyboard of FIG. 7.

FIG. 8 is a front view of the keyboard 50 of FIG. 7. In the illustrated embodiment, the keyboard 50 includes a housing 52. In certain embodiments, the housing 52 has a rectangular shape. Of course, the shape of the housing 52 of the keyboard 50 is not limited to a rectangular shape and instead can have any other desirable shape. In the illustrated embodiment, the housing 52 has a first end 56 and a second end 58. The direction "lateral" defines the general directions from the first end 56 to the second end 58 and from the second end 58 to the first end 56. A front side 60 and a back side 62 of the keyboard 50 connect the first end 56 to the second end 58. The front side 60 is adjacent to the user during normal use, and the back side 62 is distal from the user during normal use. In certain embodiments, the panel of keys 54 is disposed between the first end 56, the second end 58, the front side 60, and the back side 62 of the housing 52. The panel of keys 54 are configured for the user or pathologist to operate the computer 26.

In the illustrated embodiment, the keyboard 50 further includes a touch pad 42 in combination with the one or more rotatable control knobs 36, 38, 40. In certain embodiments, the touch pad 42 is employed by the user or pathologist for annotation or drawing and slide selection. The touch pad 42 can be any appropriate shape, such as a square, rectangular, diamond, circular, cross, or oval. Of course, the keyboard 50 need not include the touch pad 42. For example, in certain embodiments, the mouse 32 is employed instead of the touch pad 42 for annotation or drawing and slide selection.

Figure 9:
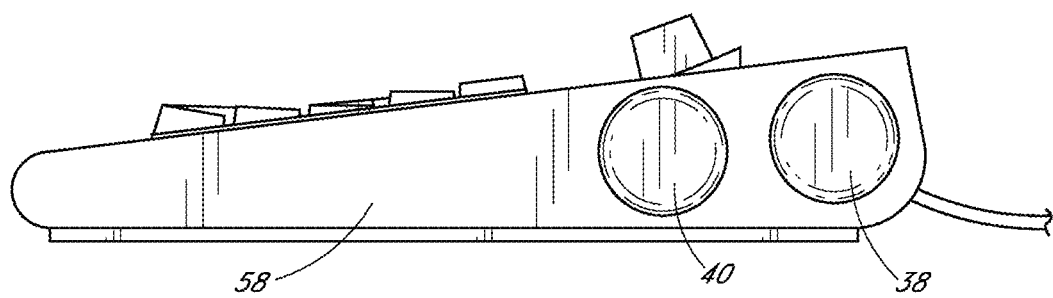
FIG. 9 is a right side view of the keyboard of FIG. 7.
Figure 10:
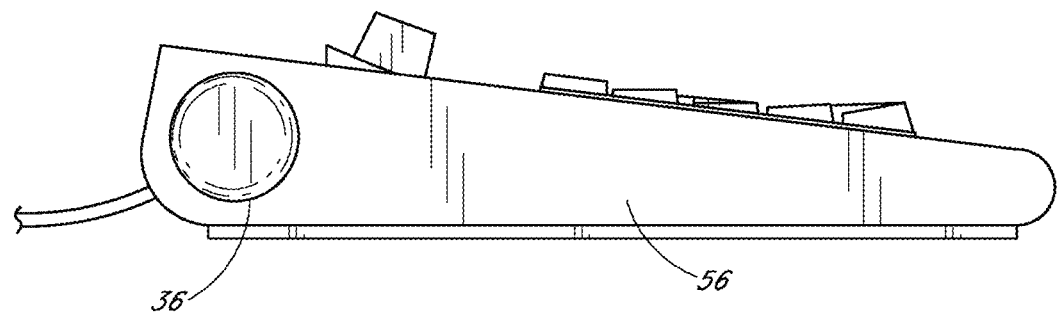
FIG. 10 is a left side view of the keyboard of FIG. 7.

FIG. 9 is a right side view of the keyboard 50 of FIG. 7. FIG. 10 is a left side view of the keyboard 50 of FIG. 7. The keyboard 50 can be operatively connected to the computer 26 (FIG. 1A) and is configured for panning and zooming an image in multiple axes relative to the display screen of the monitor 28. In this way, the keyboard 50 is configured for two-handed functionality with the one or more rotatable control knobs 36, 38, 40.

In certain embodiments, at least one of the rotatable control knobs 36, 38, 40 is disposed on each of the first and second ends 56, 58 of the housing 52. In the illustrated embodiments, the housing 52 includes two rotatable control knobs on the second end 58 of the housing 52. Of course, the invention is not limited to the illustrated embodiments. For example, in certain other embodiments, the housing 52 includes two rotatable control knobs on the first end 56 of the housing 52.

In certain embodiments, the housing 52 includes a first rotatable control knob 36 supported by the housing 52. The first rotatable control knob 36 is configured for the user or pathologist to perform a first manipulation of the image on the UI. Another one of the rotatable control knobs 36, 38, 40 is configured for the user to perform a second manipulation of the image on the display or UI. For example, in certain embodiments, the housing 52 includes a second rotatable control knob 38 supported by the housing 52. The second rotatable control knob 38 is configured for the user or pathologist to perform a second manipulation of the image on the UI. In certain embodiments, the keyboard 50 comprises a third rotatable control knob 40 disposed on either the first end 56 or the second end 58 of the housing 52. In the illustrated embodiment, the third rotatable control knob 40 is disposed on the second end 58 of the housing 52. In certain embodiments, the third rotatable control knob 40 is configured for the user or pathologist to perform a third manipulation of the image on the UI.

In certain embodiments, the first manipulation is zooming of the image and the second manipulation is panning. In certain embodiments, the first manipulation is zooming of the image, the second manipulation is panning up/down of the image, and the third manipulation is panning left/right of the image. In certain embodiments, the first manipulation, the second manipulation, and the third manipulation can be performed simultaneously by the user.

With at least one of the rotatable control knobs disposed on each of the first and second ends 56, 58 of the housing 52, both rotatable control knobs can be used simultaneously on either side of the keyboard 50 for zooming and/or panning control. In this way, zooming and panning control is separately controlled by individual hands of the user. In certain embodiments, the third one of the rotatable control knobs 36, 38, 40 is configured for panning control in a different direction. For example, in certain embodiments, the second one of the rotatable control knobs 36, 38, 40 is configured for panning control of the image along a first axis and the third one of the rotatable control knobs 36, 38, 40 is configured for panning control of the image along a second axis perpendicular to the first axis. In certain embodiments, each of the rotatable control knobs 38, 40 on the second end 58 are for panning control in either the up/down or left/right directions.

In certain embodiments, the keyboard 50 can include the microcontroller (MCU) 49 as described above. In certain embodiments, the microcontroller 49 contains one or more CPUs along with memory and programmable general-purpose input/output (GPIO). In certain embodiments, the microcontroller 49 converts the input received from the user or pathologist to commands suitable for transmission to the computer 26. For example, the microcontroller 49 can receive a plurality of position and/or zoom signals from at least the first, second, and third rotatable control knobs 36, 38, 40 and convert the position and/or zoom signals to a plurality of instructions for the computer 26 to manipulate the image displayed by the UI. In the illustrated embodiment, the keyboard 50 include the touch pad 42. In certain embodiments that include the touch pad 42, the microcontroller 49 converts the input received from the user or pathologist via the one or more rotatable control knobs 36, 38, 40 and/or touch pad 42 to commands suitable for transmission to the computer 26.

In certain embodiments, the keyboard 50 connects to the computer system 24 through an interface. In certain embodiments, the keyboard 50 connects to the computer system 24 via a wired or wireless connection. In certain embodiments, the keyboard 50 can be directly connected to a wired or wireless network without being connected to the computer system 24. In certain embodiments, the network includes one or more servers.

In certain embodiments, the data or commands from the microcontroller 49 are transmitted to the computer 26 using the Universal Serial Bus (USB) standard. Of course, the keyboard 50 can use other protocols known to a person having ordinary skill in the art for transmitting data or commands between peripherals and the computer 26. Other exemplary interfaces include serial ports, parallel ports, and game ports. Further still, the keyboard 50 and/or the other peripheral devices may be coupled directly to the system bus via an appropriate interface (not shown).

In certain embodiments, a wireless connection from the keyboard 50 may employ the Infrared Data Association ("IrDA") standard or Bluetooth radio-frequency ("RF") standard or other protocols known to a person having ordinary skill in the art.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A. B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it covers all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An input device configured to allow a user to manipulate an image displayed by a user interface (UI) of a computer, comprising:
    a housing, wherein the housing comprises a floor, a first end and a second end, the first end and the second end being disposed on opposite sides of the floor, the floor including a plurality of feet projecting from a bottom surface of the floor;
    a first rotatable control knob supported by the housing, the first rotatable control knob being configured for the user to perform a first manipulation of the image on the UI, and
    the first rotatable control knob is configured to perform another function; and
    a second rotatable control knob supported by the housing, the second rotatable control knob being configured for the user to perform a second manipulation of the image on the UI, wherein the second manipulation is different from the first manipulation,
    the first manipulation is one of zooming or panning of the image and the second manipulation is the other one of zooming or panning of the image,
    a third manipulation operable by the first knob, the second knob, or both knobs, wherein the third manipulation selects a desired image from a library of images, and
    the first rotatable control knob is disposed on the side of the first end of the housing, and the second rotatable control knob is disposed on the side of the second end of the housing, with the first rotatable control knob and second rotatable control knob extending in opposite directions, the first rotatable control knob and the second rotatable control knob being positioned relative to the floor for ergonomics in a digital pathology environment.

2. The input device of claim 1, wherein the input device is configured as a keyboard.

3. The input device of claim 1, wherein the input device further comprises a panel of keys disposed between the first end and the second end.

4. The input device of claim 1, wherein the input device is configured as a monitor, the monitor being configured to display the image.

5. The input device of claim 1, wherein the input device is configured as the computer.

6. The input device of claim 1, further comprising a third rotatable control knob disposed on either the first end or the second end of the housing, the third rotatable control knob being configured for the user to perform a third manipulation of the image on the UI.

7. The input device of claim 1, wherein the first rotatable control knob is removable from the housing.

8. The input device of claim 7, wherein the housing further comprises a connector configured to removably receive a portion of the first rotatable control knob.

9. The input device of claim 8, wherein the connector is a USB connector, and wherein the portion of the first rotatable control knob is configured to engage the USB connector.

10. The input device of claim 9, wherein the first rotatable control knob comprises a microcontroller, the microcontroller being configured to receive a position and/or zoom signal from the first rotatable control knob and convert the position and/or zoom signal to an instruction for the computer to manipulate the image displayed by the UI.

11. The input device of claim 1, further comprising a microcontroller, the microcontroller being configured to receive a plurality of position and/or zoom signals from at least the first and second rotatable control knobs and convert the position and/or zoom signals to a plurality of instructions for the computer to manipulate the image displayed by the UI.

12. The input device of claim 1, further comprising a touch pad.

13. The input device of claim 1, wherein at least the first rotatable control knob is knurled and suitable for light adjustment work and fine-tuning.

14. The input device of claim 6, wherein at least two of the first manipulation, the second manipulation, and the third manipulation can be performed simultaneously by the user.

15. The input device of claim 1, wherein the image is a scanned digital image.

16. The input device of claim 15, wherein the scanned digital image is of a tissue sample for biopsy.

17. The input device of claim 1, wherein at least one of the first rotatable control knob or the second rotatable control knob is configured for zooming and includes a coarse zoom knob coaxially aligned with a fine zoom knob.

* * * * *